Dec. 4, 1962 A. MAZZI 3,066,508
CIRCULAR KNITTING MACHINES, PARTICULARLY FOR PRODUCING STOCKINGS
Filed April 12, 1960 7 Sheets-Sheet 1

INVENTOR:
ARAMIS MAZZI
By
Richardson, David and Nardon
Attys.

Dec. 4, 1962 A. MAZZI 3,066,508
CIRCULAR KNITTING MACHINES, PARTICULARLY FOR PRODUCING STOCKINGS
Filed April 12, 1960 7 Sheets-Sheet 2

INVENTOR:
ARAMIS MAZZI
by
Richardson, David and Nardon
Attys.

Dec. 4, 1962 A. MAZZI 3,066,508
CIRCULAR KNITTING MACHINES, PARTICULARLY FOR PRODUCING STOCKINGS
Filed April 12, 1960 7 Sheets-Sheet 3
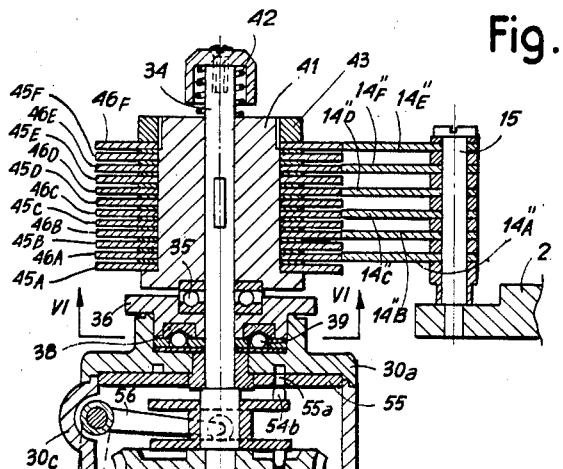
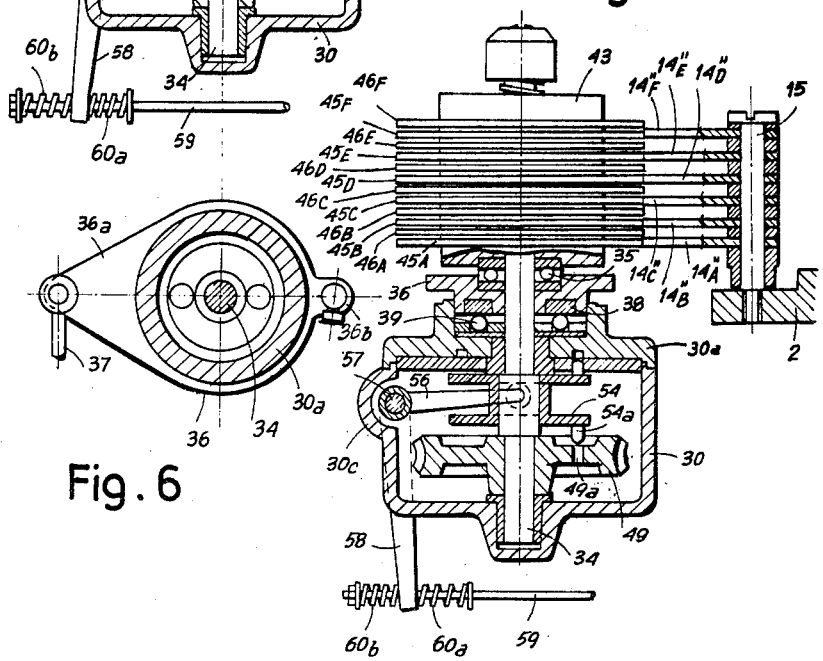
INVENTOR:
ARAMIS MAZZI
By
Richardson, David and Verdon
Att'ys.

Dec. 4, 1962 A. MAZZI 3,066,508
CIRCULAR KNITTING MACHINES, PARTICULARLY FOR PRODUCING STOCKINGS
Filed April 12, 1960 7 Sheets-Sheet 4

INVENTOR:
ARAMIS MAZZI
By
Richardson, David and Nardon
ATTY'S.

Fig. II

Dec. 4, 1962        A. MAZZI        3,066,508

CIRCULAR KNITTING MACHINES, PARTICULARLY FOR PRODUCING STOCKINGS

Filed April 12, 1960        7 Sheets-Sheet 6

INVENTOR:
ARAMIS MAZZI
By
Richardson, David and Nordon
ATTY's.

Dec. 4, 1962  A. MAZZI  3,066,508
CIRCULAR KNITTING MACHINES, PARTICULARLY FOR PRODUCING STOCKINGS
Filed April 12, 1960  7 Sheets-Sheet 7

INVENTOR:
ARAMIS MAZZI
By
Richardson, David and Nerdon
ATTYS

United States Patent Office 3,066,508
Patented Dec. 4, 1962

3,066,508
CIRCULAR KNITTING MACHINES, PARTICULARLY FOR PRODUCING STOCKINGS
Aramis Mazzi, Via G. B. Lulli 11, Florence, Italy
Filed Apr. 12, 1960, Ser. No. 21,792
Claims priority, application Italy Apr. 17, 1959
6 Claims. (Cl. 66—50)

The invention relates to circular knitting machines particularly for producing stockings and especially concerns a machine improvement by means of which jacks control needles to effect the formation of both tuck stitches and decorative patterns, in particular patterns along the welt or afterwelt of a stocking.

In general these stocking knitting machines, which form tuck stitches, include jacks having a plurality of rows of butts which cooperate with lifting cams for the knitting needles. The needles are actuated in such a way as to obtain a repetition of needle movement in groups of at least two or preferably three, four or six adjacent needles.

According to the invention there is provided at least one supplementary row of butts in addition to the rows of butts which control formation of the tuck stitches. The supplementary row cooperates with a tuck stitch control unit. In the supplementary row of butts, the butts are divided in groups of a number equal to a multiple of the number of the butts included in the groups designed for forming a tuck stitch. This arrangement enables the butts for forming the tuck stitches and the butts of this supplementary row to cooperate to effect the controls for attaining repetition of equal decorative elements in a pattern.

The invention is advantageously applied in needle control devices for forming tuck stitches which devices provide for four rows of butts in the jacks for forming a tuck stitch. In particular, the invention is applied to needle control devices including a number of slider cams designed to be selectively operated in order to act on the same number of rows of butts of the jacks for lifting the jacks in a determined progression. The jacks provided for forming the tuck stitch, include four sets of selection butts, the butts of two sets being arranged in one arc and the butts of the other two sets being arranged in another arc. In a set of four adjacent jacks, two jacks are provided with a butt having maximum length and a portion lacking a butt, and two jacks are provided with two butts having short and intermediate lengths in such a way that in each row the four jacks include three butts having three different lengths while a butt is lacking in one jack. The slider cams are adapted to be inserted to act selectively on the butts of the three different lengths. Two rows of guide butts are combined with these rows of butts for the control of tuck stitch formation.

According to the present invention, the four rows of butts are combined with butts of a supplementary row for each semi-arc. The butts are divided into sets of eight, in each of said sets butts are provided having two different lengths controllable by means of a supplementary cam and short butts having the minimum length necessary to act as guides. The supplementary rows of butts, in sets of eight or in sets which are a multiple of the number of butts in a set for forming a tuck stitch, are advantageously coincident with the short guide butts.

The guide butts of one row are provided along an arc such as half the circumference of the associated needle cylinder and the butts of the other guide row are provided in the other half-circumference of the needle cylinder and so as to effect the arrangement of the sets of control butts for forming decorative patterns which are a multiple of the number of the butts of the sets of butts which effect tuck stitch formation.

In order to effect a plurality of butt combinations, there is provided in each set of eight butts one butt having maximum length flanked on two sides by butts of an intermediate length. After the set of three butts is a lacking butt portion or a pair of guide butts and an additional intermediate length butt. This last intermediate length butt is located on a jack which includes a sole maximum length butt and another lacking butt for forming a tuck stitch. The maximum length butt of the row of butts which control formation of a decorative pattern by four needles, is located on the previously mentioned jack having a maximum length butt.

This arrangement of butts of the row of control butts for the decorative pattern, in combination with the two rows of butts for tuck stitch control, which are provided in each of the semi-circumferences of the needle cylinder, enables a stitch to be retained on eight needles, or on four needles, or alternately to be retained after one needle is lifted and after five needles are lifted and so on.

The invention will be better understood from the following description, by way of example only, of one embodiment of the invention which is illustrated in the accompanying drawings.

In the drawings:

FIGURE 5 is a section taken along the line V—V of FIGURES 3 and 4;

FIGURE 6 is a section taken along the line VI—VI of FIGURE 5;

FIGURE 7 is similar to FIGURE 5 but illustrates the members in a different position;

Figure 1:
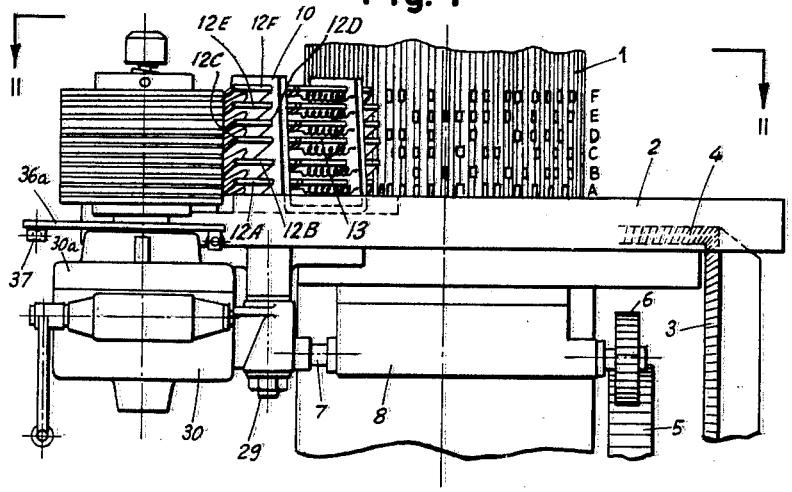
FIGURE 1 illustrates a partial lateral view of a circular knitting machine.
Figure 2:
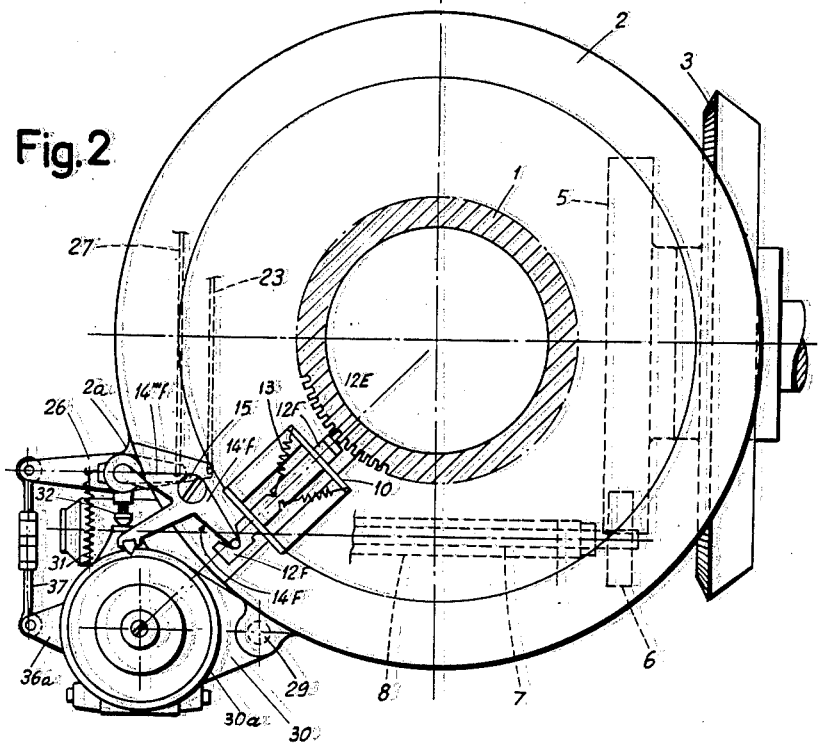
FIGURE 2 illustrates a view along the line II—II of FIGURE 1.
Figure 3:
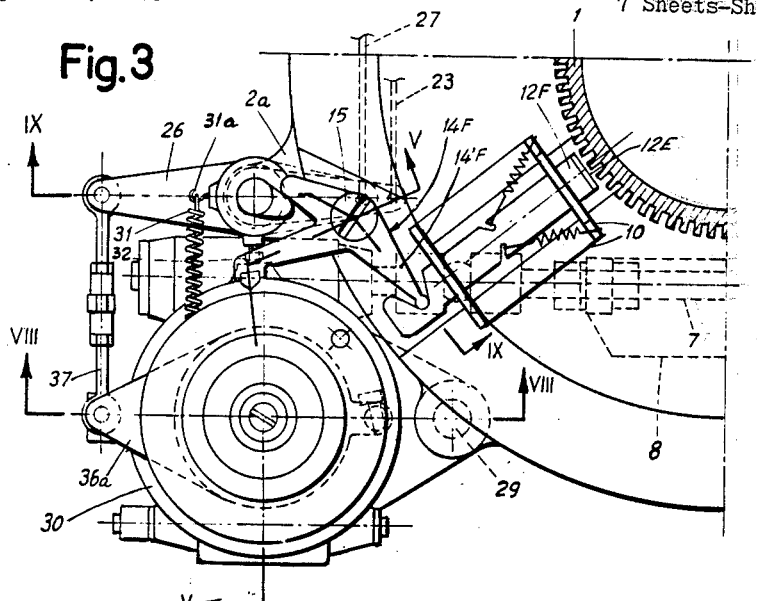
FIGURES 3 and 4 illustrate an enlarged detail of the view according to FIGURE 2 showing the arrangement of inserted and not inserted radial cams respectively.
Figure 9:
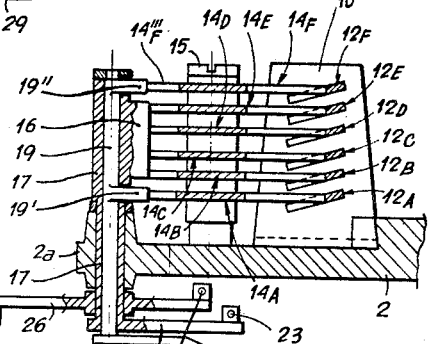

In FIGURES 1–4 of the drawing, the needle cylinder 1 is shown surrounded by a stationary platform 2 and is rotated by means of a bevel gear 3 meshing with a bevel gear 4 fixed to the cylinder 1. A geared pinion 6 is driven through a gear 5 driving and directly fixed to the gear 3, as indicated in FIG. 2. The pinion 6 in its turn drives a small shaft 7 mounted on a support 8 below the platform 2. The shaft 7 rotates the radial cams of the attachment. A support 10 forms a guide for slideably supporting six vane cams, 12A, 12B, 12C, 12D, 12E and 12F respectively, which are mounted at an inclination to the platform 2 to act on the six rows of butts A, B, C, D, E, F in FIGURE 1, and in the subsequent FIGURES 11 to 17. The cams 12A and 12F are slightly shorter than the others because they must not act on the shortest butts of the rows A and F, which butts serve only for guiding the jacks. The butts of said rows A, B, C, D, E, F are carried by corresponding jacks below the associated needles and which are hereinafter particularly described. The cams 12A to 12F are each urged by a corresponding pair of springs 13 to insert them fully for lifting the jacks and thus the needles. For withdrawing the six vane cams 12A to 12F from the inserted position, the cams are each provided at the rear with a V shaped recess which is engaged by an arm forming part of bell-crank levers 14A to 14F (see FIG. 9) each of which levers has three arms. In particular, the bell-crank lever 14F, seen in FIGURES 3 and 4, has the arm 14′F, a second arm 14″F and a third shorter arm 14‴F.

The levers 14A to 14F are pivoted to a column or stud 15 carried by the circular platform 2. The third arm of each of the levers 14A to 14F may be actuated (in order to actuate in its turn the corresponding cams 12A–12F, by means of a system of flag-shaped trip levers, seen in particular in FIGURE 9. In order to actuate the bell-crank levers 14B, 14C, 14D and 14E, a central vertically extended trip lever 16 is provided on a tubular shaft 17, which is mounted on a core journalled in an extension 2a of the platform 2. A second shaft 19 is mounted in the interior of the shaft 17 and the shaft 19 is provided with two trip levers 19′ and 19″, projecting from two openings in the tubular shaft 17, and arranged to move angularly with respect to the shaft 17. The two levers 19′, 19″ act on the bell-crank levers 14A and 14F respectively, and thus on the cams 12A and 12F. The shafts 17 and 19 are actuated by two small levers 20 and 21 respectively, the latter being actuated by tie rods 23 and 24 from the main drum of the machine.

A rocker arm 26 connected to a tie rod 27, is also pivoted to the tubular shaft 17 below the platform 2, for a purpose hereinafter described.

Figure 11:
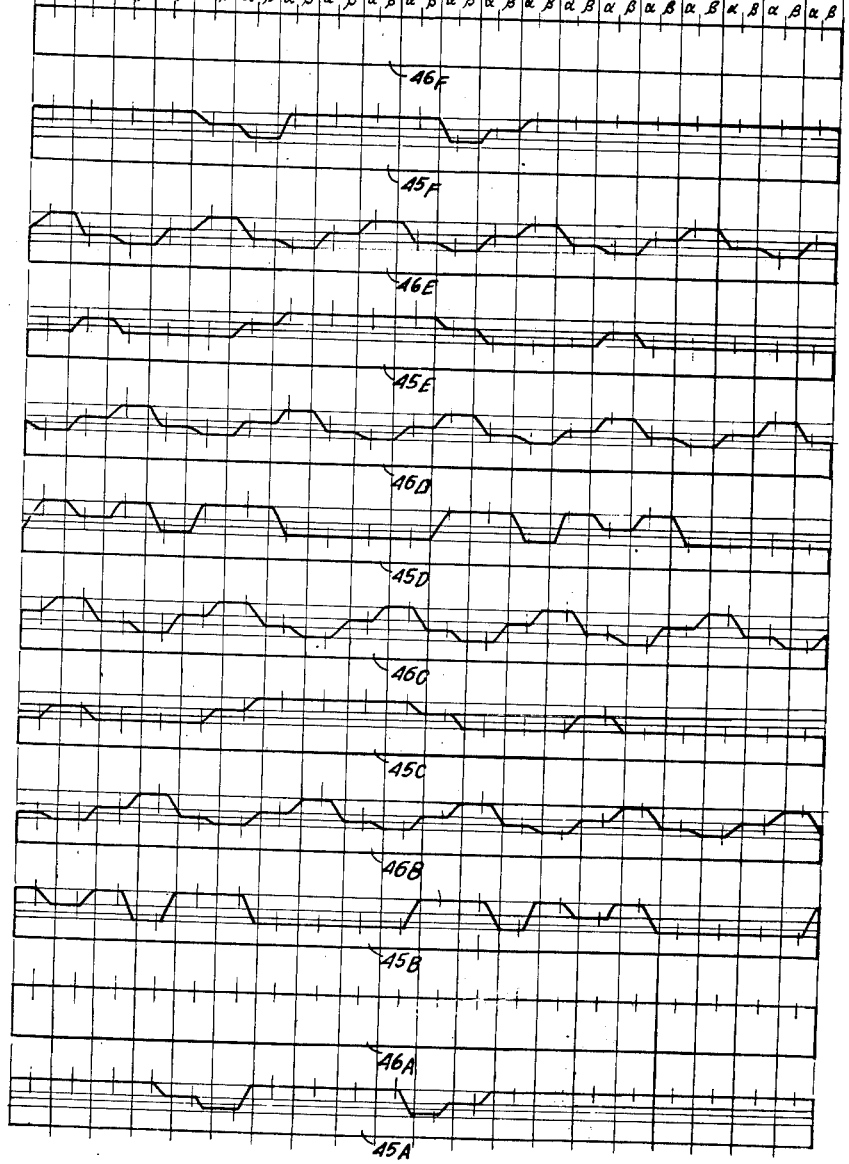
FIGURE 11 illustrates the development of two interposed sets of cams.
Figure 12:
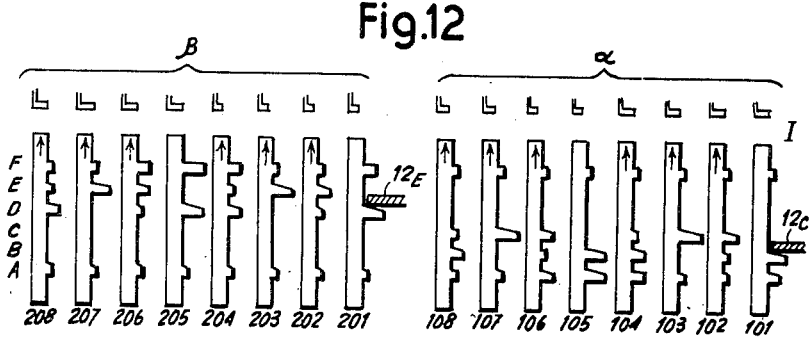
FIGURES 12, 13, 14, 15, 16, 17 and 18 illustrate the jacks and the arrangement of the jack control means for the formation of the pattern.
Figure 13:
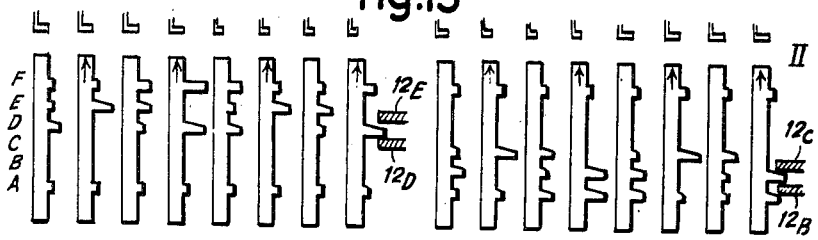
Figure 14:
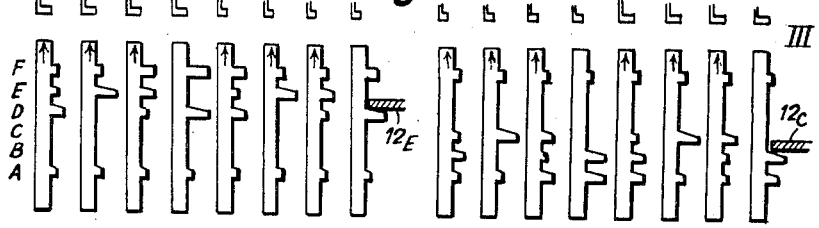
Figure 15:
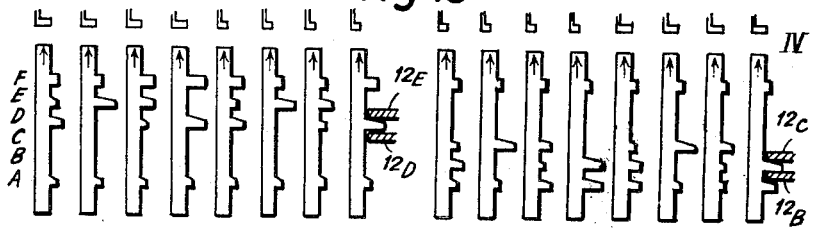
Figure 16:
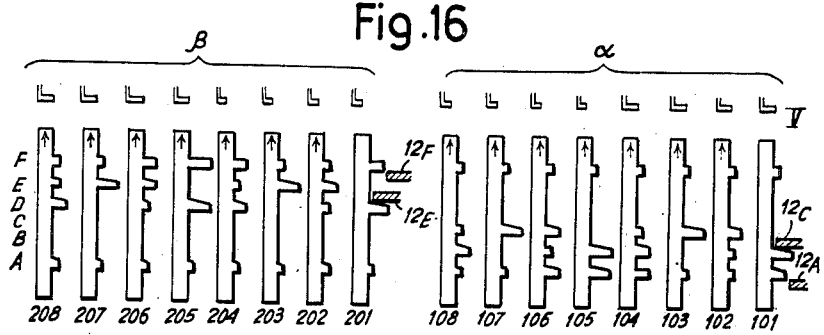
Figure 17:
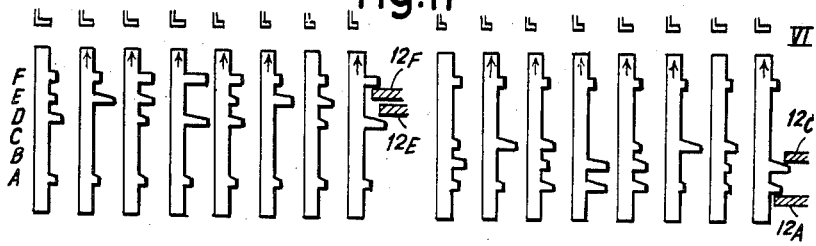

On a pin 29 mounted below the platform 2 a box 30 is pivoted containing a rotary unit for actuating the cams. The box 30 is urged by a spring 31 fixed at 31a to the extension 2a (FIGURE 4) so that an adjustable shoulder member 32 carried by the box engages against a projection of the extension 2a in such a way as to determine a working position. The box 30 contains a vertical shaft 34 mounted in the bottom and lid 30a of the box 30 (FIGURES 5–8). A thrust bearing 35 is mounted on the shaft 34 and the bearing is fitted in a lid member 36 located in a housing in the lid 30a. The lid member 36 is formed so as to be angularly movable around the shaft 34 and is provided with an operating extension 36a (FIGURE 6) to which one end of an adjustable rod 37 is pivoted, the other end of the rod being connected to the opposite end of the rocker arm lever 26. The lid 36 carries an annular member 38 provided with two conical seats wherein two small balls 39 are housed, said balls engaging in housings formed by a disc built into the lid 30a. This arrangement in the position wherein the balls fit into the conical cavities of the ring 38 allows the lid to be lowered, while angularly moving said lid 36 and thus shifting the conical seats of the balls, causes the lid 36, 36a and thus the bearing 35 to be lifted. The movement in the counterclockwise direction of the member 36, 36a, 36b, is limited by a stop 40 (see FIGURES 3 and 4) carried by the lid 30a of the box 30. A drum 41 rotatable with, but slidable along, the shaft 34, is urged by an axial spring 42 to rest on the bearing 35. On the drum 41 twelve radial cams are assembled and retained in spaced apart relationship and fixed by a clamping nut member 43. These cams are divided into two series or sets of six cams each, respectively 45A, 45B, 45C, 45D, 45E, 45F and 46A, 46B, 46C, 46D, 46E, 46F, the cams on one set alternating with the cams of the other set. The profile of the cams 45A–45F and 46A–46F is shown in FIGURE 11. The arrangement of the cams is such that in one of the axial positions of the drum 41, the cams 45A to 45F (FIGURE 7) act on the feeler arms 14″A, 14″B, 14″C, 14″D, 14″E 14″F, while in the other lowered position of the drum 41 the cams 46A to 46F (FIGURE 5) act on the same feeler arms 14″A–14″F. The movement of the cams in the axial direction because of cooperation of the balls 39 with the seatings in the ring 38 is allowed when the box 30 is moved around the pivot 29 away from the feelers 14″A–14″F (FIGURE 4) or when the feeders 14″A–14″F are contacted and turned by the trip levers 16 and 19′, 19″.

Figure 10:
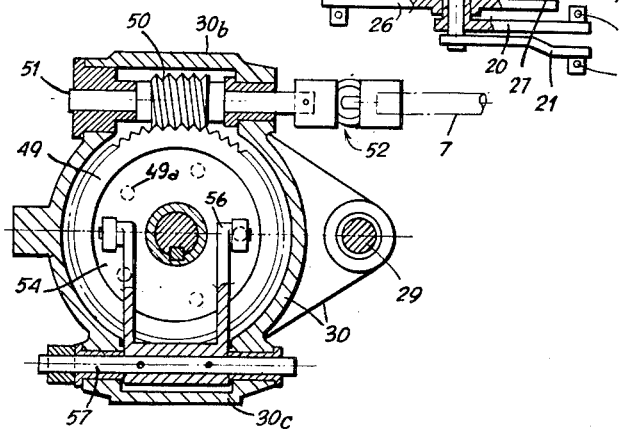
FIGURE 10 illustrates a section taken along the line X—X of FIGURE 8.

The shaft 34 is driven in the following way. A worm gear 49 is free to turn on the shaft 34. The gear 49 is provided with five holes 49a regularly distributed around the gear. As shown in FIGURE 10 the gear 49 meshes with a worm screw 50 mounted on a shaft 51 which is carried by a projection 30b of the supporting box 30. The shaft 51 is connected through a universal joint 52 to the shaft 7 and may also reciprocate axially with respect to said shaft 7. As shown in FIGURE 4A, shaft 7 is inserted in bore 52a of joint 52. A pin 7a extending transversely of the shaft 7 slides in slot 52b formed in the joint 52. A sheave disc 54 (see also FIGURE 8) is assembled to slide along but rotate with the shaft 34. The disc 54 on its underside carries a pin 54a which is capable of engaging in any one of the holes 49a of the drive gear 49 and also its upper flange portion carries a pin 54b which may engage in a single hole 55a formed in an adjustable member 55 disposed immediately below the lid 30a. The annular sheave member 54 may be moved along the shaft 34 to engage, through the pin 54a, with the drive gear 49, or may be moved to be locked, together with the shaft 34, by the engagement of the pin 54b in the single hole 55a. The lengths of the pins 54a and 54b are such that until one moves into engagement in a hole, the other pin is not released from the hole wherein it is engaged. The sheave member 54 is moved by means of a fork 56 which is carried by a shaft 57 mounted on a projection 30c of the box 30 (see particularly FIGURE 10). An outer control lever 58 is fixed to the shaft 57 (see FIG. 7). The lever is moved by a control rod 59 engaging the lever through a pair of springs 60a and 60b. When the rod 59 is moved, one or the other of the springs is loaded (see FIGURES 5 and 7) and the fork 56 thus effects the tripping movement of the member 54 from one to the other of the positions only when the corresponding pin engages in a seating during the rotation of the wheel 49. Therefore locking of the shaft 34 is effected with the possibility of shift of the radial cams assembly with respect to the cylinder 1 by effect of the engagement of pin 54a in the holes 49a of the wheel 49, and a well defined stopping position by effect of the engagement of the pin 54b in the single hole 55a. When the rotation ratio between the cylinder 1 and the shaft 34 is 1:20, and there are five holes 49a, the engagement of the pin 54a with the wheel 49 is obtained at most after four revolutions of the needle cylinder 1. The cycle of the machine repeats after each four revolutions of cylinder 1. Thus the pattern always begins from a certain position of the cams.

Through the tie rod 37 and rocker arm lever 26 it is possible to put the set of cams 45A–45F and the set of cams 46A–46F in operation and to effect movement of the entire assembly of the cams and their support 30 in such a way as to obtain a displacement of the cams from the arms 14″A–14″F. For this purpose, the pair of stops 36b, 40 is used. During rotation of the box 30 in a counterclockwise direction (with respect to FIGURES 3 and 4) by means of the rod 37, movement of the lid member 36, 36a, 36b, first occurs. Then the cams are turned. After stops 30b and 40 have come into contact, the box 30 turns about pin 29 due to locking of lid 36 with box 30.

The cams 46A to 46F are designed to form the tuck stitch. For this purpose, only the cams 46B, 46C, 46D and 46E are used, while the cams 46A and 46F, designed to act on the vane cams 12A and 12F, are inactive. Flag cams 19′, 19″ keep the vane cams 12A and 12F completely out of the insertion position. In this position, the drum 41 is lowered to bring the cams 46A–46F into alignment with the bell-crank levers 14A–14F.

Figure 19:
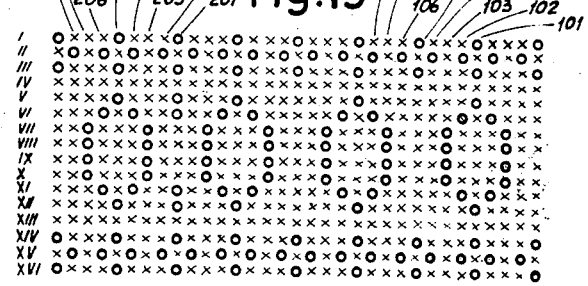
FIGURE 19 illustrates the decorative pattern obtained through the cams and controls.

The cams 45A and 45F on the other hand, serve to form a decorative pattern which, in this particular example, is that shown in FIGURE 19. The description which follows is of the movements and the positions of the vane cams 12A–12F which are determined by the cams 45A–45F, to form the courses of stitches I, II, III, IV, V, VI and VII, shown in FIG. 11, as well as in FIGURE 19. The other courses VIII–XVI correspond respectively to courses VII, VI, V, IV, III, II and I.

The jacks as shown in each of FIGURES 12 to 18, are divided in two arcs of different groups of jacks, i.e. in two half-circumferences indicated by α and β. In the half revolution α groups of eight jacks 101, 102, 103, 104, 105, 106, 107 and 108 are provided; in the subsequent half revolution β groups of eight further jacks 201, 202, 203, 204, 205, 206, 207 and 208 are provided. The jacks of the groups from 101 to 108 have three sets of butts in the rows A, B, C, in addition to a set of short butts exclusively for guidance purposes in the row F. The jacks of the groups of the half revolution β i.e. the jacks from 201 to 208 on the other hand have only short guide butts in the row A and three sets of butts in the rows D, E, F. The row A provides in the groups of jacks from 101 to 108 respectively a butt having an intermediate length (for instance 2.5 mm.), then two minimum length butts, sufficient only for guidance, followed by an intermediate length butt, a maximum length butt (for instance 4 mm.), an intermediate length butt and two minimum length guide butts. In the row F, the jacks from 201 to 208 have respectively an intermediate length butt, two short guide butts, an intermediate length butt, a maximum length butt, an intermediate length butt and two short guide butts. Therefore in the two rows A and F in the corresponding active half revolutions are provided an intermediate length butt, a maximum length butt and an intermediate length butt separated in both directions from an intermediate length butt by two short guide butts. The butts of the rows A and F cooperate with the butts of the intermediate rows B, C, D, E during formation of tuck stitches.

Figure 4:
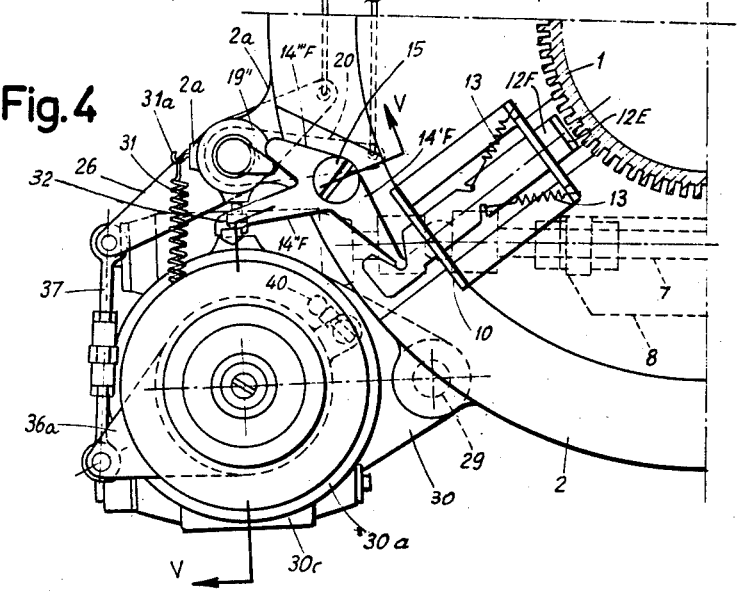
Figure 4A:
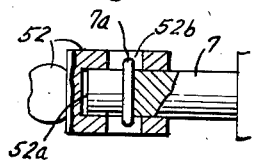
FIGURE 4A is a sectional view on an enlarged scale through a universal joint.
Figure 8:
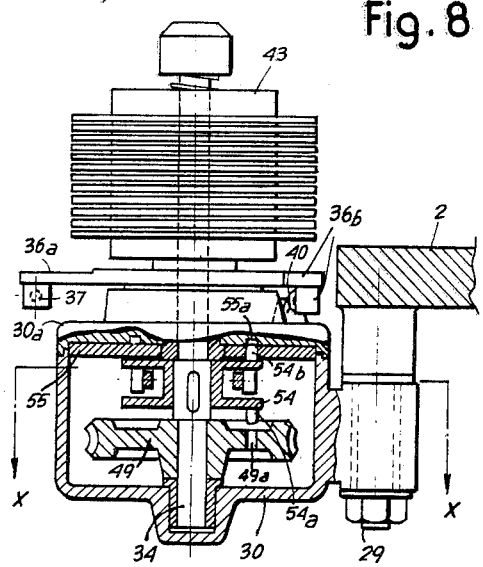
FIGURES 8 and 9 illustrate sections taken along the lines VIII—VIII and IX—IX respectively of FIGURE 3.

At the start of formation of a double welt of a stocking, the arrangement of the members is as shown in FIGURE 4, in which the vane cams 12A–12F are withdrawn and are selected, by means of the flag levers 16 and 19', 19" in order to set up the welt. In particular the vane cams 12A and 12F are excluded, while the vane cams 12B, 12C, 12D and 12E are inserted by the flag cams 16 to act only on the maximum length butts. The welt is formed by the needles in known manner. The cam drum is lifted to place the cams 45A–45F in operating position. The action of the rocker arm 26 effects the approach of the cam assembly 45A–45F to the levers 14A–14F (passing from FIGURE 4 to FIGURES 3 and 7). Control of the levers 14A–14F is effected by means of the cams 45A–45F for the formation of the decorative pattern. In this position, the cams 45A–45F are stationary since the pin 54b is then engaged in hole 55a of disc 55. The cams 45A–45F are located in this stationary position (FIGURE 7) as indicated by the zones XVII, XVIII, XIX and XX, which correspond with the total insertion of the vane cams 12B, 12C and 12D and 12F to effect the plain stitch in the under-welt before the formation of the pattern. In this arrangement, as the cams 45A–45F are moved to act on the bell crank levers 14A–14F, the rotation of the radial cams is started by means of the clutch actuated by the fork 46. The radial cams may effect one revolution for each twenty revolutions of the needle cylinder 1 starting from the revolution or course indicated by I (see FIGURES 11, 12 and 19) if the machine includes a supplementary feed for forming a plain stitch in each of the revolutions I to XX. If the machine is provided with a single feed, the drive ratio is increased and a plain stitch course is interposed between each of the courses as illustrated, obtainable as in the course IV.

During the first half α of the revolution or course I, the vane cam 12C is fully inserted by the cam 45C. Therefore in each group of eight jacks from 101 to 108 the jacks 102, 103, 104, 106, 107, 108 are lifted and the needles corresponding to the two jacks 101 and 105 are lowered and not cleared. In this first half α of the revolution I, while the jacks of the group 101 to 108 pass in front of the cams 12A–12F, the cam 45E keeps the cam 12E completely inserted (FIGURE 12 on the left hand side) while the cam 12D is disengaged. At the second half β of revolution I the jacks 202, 203, 204, 206, 207, 208 are lifted and the jacks 201 and 205 are lowered. In this second half revolution, the cams 45B and 45C are preset for action during the succeeding first half α of revolution II.

During the first half α of revolution II, the cams 12B and 12C are inserted by cams 45B–45C to such an extent that they only lift the jacks having the maximum length butts in the rows B and C. Therefore, in each group of jacks 101 to 108, the jacks 101, 103, 105, 107 are lifted and the needles corresponding to the jacks 102, 104, 106 and 108 are lowered and not cleared. In this half revolution α of revolution II, while the jacks 101 to 108 pass in front of the cams 12A–12F, the cams 45D and 45F allow the insertion of the cams 12D and 12E to the position illustrated in FIGURE 13 on the left hand side, whereby at the second half β of said revolution II, the jacks 201, 203, 205, 207 are lifted and the jacks 202, 204, 206, 208 are lowered. In this second half revolution β, the cams 45B and 45C are arranged to act in the half revolution α of the revolution III.

During the first half α of the revolution III (also see FIGURE 14), the cam 12C is totally inserted. Therefore in this half α of the revolution III, the same needle selection is obtained as that of revolution I (see FIGURE 12). Also in the second half β said revolution III, the same control is obtained as in the half β of the revolution I (see FIGURE 12). During the latter half of revolution III, the cams 12B and 12C are arranged to act in the first half revolution α of the revolution IV.

During the first half α of the revolution IV (see FIGURE 15), the cams 12B and 12C are totally inserted. All the jacks and all the needles are lifted in each group of jacks 101 to 108 to form a plain stitch. In this first half α of the revolution IV, while the jacks 101 to 108 pass in front of the cams 12A–12F, the cams 12D and 12E (see FIGURE 15 on the left hand side) are totally inserted. In the second half β of revolution IV all the jacks 201 to 208 are lifted for the formation of the plain stitch. In this second half revolution β, the cams 45 act on the cams 12A and 12C to preset them for action in the first half α of the revolution V.

During the first half α of revolution V (see FIG. 16) the cam 12A is inserted to act only on the maximum length butts and the cam 12C is totally inserted. The jacks 102 to 108 are lifted while the jack 101 is lowered so that the stitch is not cleared for one needle in each eight needles. In this first half α of the revolution V, while the jacks 101 to 108 pass in front of the cams 12A–12F, the cams 45E and 45F cause the totally inserted cam 12E and the inserted cam 12F to act only on the maximum length butts (see FIGURE 16 on the left hand side) so that at the second half β of the revolution V, the needles corresponding to jacks 202 and 208 are lifted and the needles corresponding to jack 201 is lowered. One needle in each eight needles is not cleared. In this second half revolution β, the cams 45A and 45C act on the cams 12A and 12C to preset them for action in the first half revolution α of the revolution VI.

During the first half α of the revolution VI (see FIG. 17) the cam 12A is inserted to act on the intermediate length butts and maximum length butts and cam 12C acts only on the maximum length butts. The jacks 101, 103, 104, 105, 106 and 107 are lifted in each group of jacks 101 to 108 and the jacks 102 and 107 are lowered. The corresponding two needles do not clear the stitch. The two needles are separated alternately by one needle and by five needles. In this first half α of the revolution VI, while the jacks 101 to 108 pass in front of the cams 12A–12F, the cams 45E and 45F effect movement of the cams 12E and 12F (see FIG. 12 on the left hand side). At the second half β of the revolution VI, the jacks 201, 203, 204, 205, 206, 207 are lifted and the jacks 202 and 208 are lowered, so that the stitches of the spaced needles are not cleared as in the previous half revolution. In this second half revolution β the cams 45A–45F act on the cams 12A–12F to arrange them for action in the first half revolution α of revolution VII.

Figure 18:
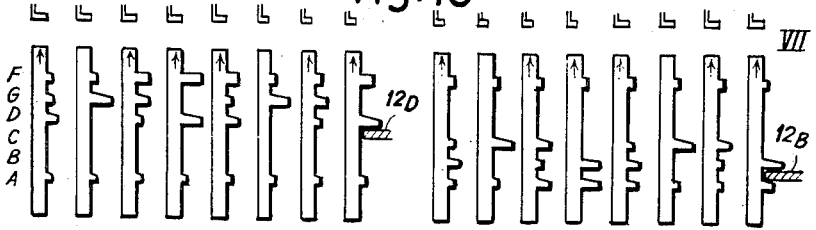

During the first half α of revolution VII (see FIGURE 18), the cam 12B is totally inserted. The jacks 101, 102, 104, 105, 106 and 108 are lifted in each group of jacks 101 to 108, and the jacks 103 and 107 are lowered, so that one needle in each three needles does not clear the stitch. In this first half α of the revolution or course VII, while the jacks 101 to 108 pass in front of the cams 12A–12F, 45D effects complete insertion of the cam 12D (FIG. 18 of the left hand side). In the second half β of revolution VII, the jacks 201, 202, 204, 205, 206 and 208 are lifted and the jacks 203 and 207 are lowered. As a result one needle in each three needles does not clear the stitch.

During the courses subsequent to the seventh one, i.e. the courses VIII, IX, X, the arrangement is the same as in FIGURE 18. The arrangements of jacks in the successive courses, during which the pattern (see FIG. 19) is produced, are the same respectively as the arrangements of FIGURES 17, 16, 15, 14, 13, 12.

After each of the courses indicated from I to XVI there is advantageously interposd a course producing a plain stitch. This course may be obtained by a supplementary feed, in which case the cams 45A–45F described for the courses I to XVI are those illustrated. In the event of a single feed between each of the courses I to XVI, the cams 45 are modified so that a plain stitch course may be obtained and this can be obtained directly by putting the cams 12A–12F in the arrangement illustrated in FIGURE 15 (corresponding to the course IV). It is apparent that during the formation of the underwelt, before the start of the pattern and then subsequently to the pattern or to the repetition thereof, plain stitch courses are effected. In particular, the plain stitch courses obtained before the start of the pattern of FIGURE 19 are obtained when the drum 41 is lifted to put the cams 45A to 45F in operation and as these cams are stopped by means of the system 54B and 55A, the stopping occurs in such a position that the arcs of the cams 45A–45F corresponding positively to the courses from XVII to XX (on the right hand side of FIGURE 11) are active for the feeler arms 14″. The plain stitches are effected subsequent to the decorative pattern courses in four revolutions or with the addition of further ones produced by stopping the cams 45A–45C in the above mentioned angular positions. Alternatively, the latter plain stitch course may be obtained by inserting one of movable cams 12A–12F for lifting all the needles.

What I claim is:

1. In a machine for manufacture of stockings, in combination: a rotatable needle cylinder having a series of circumferentially spaced grooves, a needle slidably disposed in each of the grooves, an assembly of jacks respectively disposed adjacent the grooves in the cylinder for lifting the needles therein, said jacks having butts extending outwardly for entering the grooves to lift the needles therein, said butts being arranged in six spaced rows, each of said butts having any one of three different lengths, four of said rows of butts being effective in forming tuck stitches, two of said four rows of butts being disposed arcuately in one semicylindrical array of some of the jacks, the other two of said four rows of butts being disposed arcuately in another semicylindrical array of the remainder of the jacks, two jacks in a group of four adjacently positioned jacks of either array each having a butt of maximum length and a lacking butt, the other two jacks of the group of four jacks each having two butts of intermediate length, a plurality of short guide butts along one row in said one array of jacks, a group of eight butts along another row in the other array of jacks, said group of eight butts including a first group of three butts having a butt of maximum length disposed between two butts of intermediate length, a second group of two butts, a third group of two butts, and an eighth butt having an intermediate length, the group of three butts being disposed between the second and third groups of butts, the eighth butt being disposed next to the third group of two butts, said eighth butt being disposed on a jack having a butt of intermediate length and a lacking butt, to form a tuck stitch.

2. In a machine for manufacture of stockings, the combination according to claim 1, further comprising a main rotatable control drum, four slider cams disposed to engage butts of intermediate length on four of said rows of butts, two additional slider cams disposed to engage butts in external rows respectively above and below said four rows of butts, a first yarn feeding means operatively associated with all of the slider cams, a second yarn feeding means angularly spaced from said first yarn feeding means, spring means urging said slider cams to engage butts in the six rows thereof, six multiple arm levers pivotally mounted and disposed to engage the slider cams respectively and withdraw the same away from the butts in the six rows, a first set of six coaxial circular continuously rotatable cams engaged by said levers for pivoting the same, a structure supporting said circular cams, said structure being transversely movable to the axis of the circular cams for selectively placing the circular cams in operative positions, and vane cams disposed to engage arms of said levers for actuating the slider cams, two of said circular cams being smooth and four of said circular cams being contoured to effect actuation of only the four slider cams.

3. In a machine for manufacture of stockings, the combination according to claim 2, further comprising a second set of six rotatable coaxial circular cams alternately interposed with the cams of the first of circular cams to act on said slider cams for forming a decorative pattern, means including balls carried in seats in said structure, a member provided with tracks for said balls and angularly movable coaxially with said circular cams to effect axially movement of the circular cams to bring either set of circular cams into operative positions with respect to said levers, drive means for rotating the circular cams in either axial position of the circular cams, and an engaging member rotatable with the circular cams to lock the cams in particular angular positions with respect to said structure and said drive means.

4. In a machine for manufacture of stockings, in combination: a rotatable needle cylinder having a series of circumferentially spaced grooves, a needle slidably disposed in each of the grooves, an assembly of jacks respectively disposed adjacent the grooves in the cylinder for lifting the needles therein, said jacks having butts extending outwardly for entering the grooves to lift the needles therein, said butts being arranged in six spaced rows, each of said butts having any one of three different lengths, four of said rows of butts being effective in forming tuck stitches, two of said four rows of butts being disposed arcuately in one semicylindrical array of some of the jacks, the other two of said four rows of butts being disposed arcuately in another semicylindrical array of the remainder of the jacks, two jacks in a group of four adjacently positioned jacks of either array each having a butt of maximum length and a lacking butt, the other two jacks of the group of four jacks each having two butts of intermediate length, a plurality of short guide butts along one row in said one array of jacks, groups of butts in numbers of multiples of four along another row in the other array of jacks, each of said groups including butts of maximum, intermediate and short length, a main rotatable control drum, four slider cams disposed to engage butts of intermediate length on four of said rows of butts, two additional slider cams disposed to engage butts in external rows respectively above and below said four rows of butts, a first yarn feeding means operatively associated with all of the slider cams, a second yarn feeding means angularly spaced from said first yarn feeding means, spring means urging said slider cams to engage butts in the six rows thereof, six multiple arm levers pivotally mounted and disposed to engage the slider cams respectively and withdraw the same away from the butts in the six rows, a first set of six coaxial circular continuously rotatable cams engaged by said levers for pivoting the same, a structure supporting said circular cams, said structure being transversely movable to the axis of the circular cams for selectively placing the circular cams in operative positions, and vane cams disposed to engage arms of said levers for actuating the slider cams, two of said circular cams being smooth and four of said circular cams being contoured to effect actuation of only the four slider cams.

5. In a machine for manufacture of stockings, the combination according to claim 4, further comprising a second set of six rotatable coaxial circular cams alternately interposed with cams of the first set of circular cams to act on said slider cams for forming a decorative pattern, and means to effect axial movement of the circular cams to bring either set of circular cams into operative positions with respect to said levers.

6. In a machine for manufacture of stockings, the combination according to claim 5, further comprising drive means for rotating the circular cams in either axial position of the circular cams, and an engaging member rotatable with the circular cams to lock the cams in particular angular positions with respect to said structure and said drive means.

References Cited in the file of this patent

UNITED STATES PATENTS

| | | |
|---|---|---|
| 2,025,463 | Lombardi | Dec. 24, 1935 |
| 2,208,698 | Lawson et al. | July 23, 1940 |
| 2,872,796 | Peel | Feb. 10, 1959 |
| 3,004,414 | Billi | Oct. 17, 1961 |